(12) United States Patent
Lofgren et al.

(10) Patent No.: US 8,059,815 B2
(45) Date of Patent: Nov. 15, 2011

(54) TRANSFORMING DATA FILES INTO LOGICAL STORAGE UNITS FOR AUXILIARY DATA THROUGH REVERSIBLE WATERMARKS

(75) Inventors: Neil E. Lofgren, White Salmon, WA (US); Burt W. Perry, Lake Oswego, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 2821 days.

(21) Appl. No.: 10/435,612

(22) Filed: May 8, 2003

(65) Prior Publication Data

US 2004/0044894 A1  Mar. 4, 2004

Related U.S. Application Data

(63) Continuation-in-part of application No. 10/319,404, filed on Dec. 12, 2002, application No. 10/435,612, which is a continuation-in-part of application No. 10/319,380, filed on Dec. 13, 2002, now Pat. No. 7,187,780.

(60) Provisional application No. 60/404,181, filed on Aug. 16, 2002, provisional application No. 60/340,651, filed on Dec. 13, 2001, provisional application No. 60/430,511, filed on Dec. 2, 2002, provisional application No. 60/430,500, filed on Dec. 2, 2002.

(51) Int. Cl.
*H04N 7/167* (2011.01)

(52) U.S. Cl. .......... 380/201; 380/203; 705/57; 713/176; 726/30; 725/31

(58) Field of Classification Search .................. 380/201, 380/236, 203; 705/57; 713/176; 726/30; 725/31

See application file for complete search history.

(56) References Cited

U.S. PATENT DOCUMENTS

| | | | |
|---|---|---|---|
| 4,750,173 A | 6/1988 | Bluthgen | 370/528 |
| 5,146,457 A | 9/1992 | Veldhuis et al. | 370/523 |
| 5,646,997 A | 7/1997 | Barton | 380/23 |
| 6,192,138 B1 | 2/2001 | Yamadaji | 382/100 |
| 6,215,421 B1 | 4/2001 | Kondo et al. | 341/10 |
| 6,278,791 B1 | 8/2001 | Honsinger et al. | 382/100 |
| 6,456,726 B1 * | 9/2002 | Yu et al. | 382/100 |

(Continued)

FOREIGN PATENT DOCUMENTS

EP  1 220 152  11/2002

(Continued)

OTHER PUBLICATIONS

De Vleeschouwer et al, "Circular interpretation of histogram for reversible watermarking," IEEE Fourth Workshop on Multimedia Signal Processing, pp. 345-350, Oct. 2001.

(Continued)

*Primary Examiner* — Eleni Shiferaw
*Assistant Examiner* — Paul Callahan

(57) ABSTRACT

A reversible watermarking program transforms a host data file into a logical storage unit for auxiliary data files by embedding the auxiliary files in the data stored in the host data file. The reversible watermark modifies host data such as an image, audio, video, or software code, to carry auxiliary data. For perceptual content such as visual or audio media, the reversible watermark can maintain a desired level of perceptual quality, effectively hiding the auxiliary data in the host data. The reversible watermark enables the original host data prior to modifications due to the embedding to be restored.

28 Claims, 7 Drawing Sheets

*Image or other data set*

U.S. PATENT DOCUMENTS

| | | | |
|---|---|---|---|
| 6,490,681 B1 | 12/2002 | Kobayashi et al. | |
| 6,523,114 B1 | 2/2003 | Barton | 713/176 |
| 6,546,139 B1 | 4/2003 | Kondo et al. | 382/232 |
| 6,819,776 B2* | 11/2004 | Chang | 382/100 |
| 7,006,662 B2 | 2/2006 | Alattar et al. | |
| 7,073,065 B2* | 7/2006 | Stone | 713/176 |
| 7,113,615 B2* | 9/2006 | Rhoads et al. | 382/100 |
| 7,187,780 B2 | 3/2007 | Tian et al. | |
| 7,515,730 B2 | 4/2009 | Tian et al. | |
| 7,542,587 B2 | 6/2009 | Tian et al. | |
| 7,561,714 B2 | 7/2009 | Tian et al. | |
| 7,599,518 B2 | 10/2009 | Alattar et al. | |
| 2001/0021260 A1 | 9/2001 | Chung et al. | 382/100 |
| 2001/0044899 A1 | 11/2001 | Levy | 713/176 |
| 2001/0054146 A1 | 12/2001 | Carro et al. | 713/171 |
| 2002/0027994 A1 | 3/2002 | Katayama et al. | 380/269 |
| 2002/0040433 A1 | 4/2002 | Kondo | 713/180 |
| 2002/0059520 A1 | 5/2002 | Murakami et al. | 713/176 |
| 2002/0080964 A1 | 6/2002 | Stone et al. | 713/176 |
| 2002/0083324 A1 | 6/2002 | Hirai | 380/255 |
| 2002/0114463 A1 | 8/2002 | Pelly et al. | 380/210 |
| 2002/0118859 A1 | 8/2002 | Stone et al. | 382/100 |
| 2002/0124173 A1 | 9/2002 | Stone | 713/176 |
| 2002/0146123 A1 | 10/2002 | Tian | 380/234 |
| 2002/0171853 A1 | 11/2002 | Wu | 358/1.9 |
| 2002/0199106 A1 | 12/2002 | Hayashi | 382/100 |
| 2003/0053653 A1 | 3/2003 | Rhoads | 382/100 |
| 2003/0081809 A1 | 5/2003 | Fridrich et al. | 713/176 |
| 2003/0149879 A1 | 8/2003 | Tian et al. | 131/176 |
| 2010/0086170 A1 | 4/2010 | Tian | |
| 2010/0135525 A1 | 6/2010 | Tian et al. | |
| 2010/0254566 A1 | 10/2010 | Alattar | |

FOREIGN PATENT DOCUMENTS

| | | |
|---|---|---|
| WO | 99/17537 | 4/1999 |
| WO | 02/089056 | 7/2002 |

OTHER PUBLICATIONS

De Vleeschouwer et al, "Circular interpretation of bijective transformations in lossless watermarking for media asset management," IEEE Transactions on Multimedia, vol. 5, No. 1, pp. 97-105, Mar. 2003.

Domingo-Ferrer et al, "Invertible spread-spectrum watermarking for image authentication and multilevel access to precision-critical watermarked images," Proc. IEEE Int'l Conf on Information Technology: Coding and Computing, pp. 152-157, Apr. 2002.

Fridrich et al, "Invertible authentication," Proc. SPIE, vol. 4314, pp. 197-208, Jan. 2001.

Fridrich et al, "Invertible authentication watermark for JPEG images," Proc. IEEE Int'l Conf on Information Technology: Coding and Computing, pp. 223-227, Apr. 2001.

Fridrich et al, "Lossless data embedding for all image formats," Proc. SPIE, vol. 4675, pp. 572-583, Jan. 2002.

Goljan et al, "Distortion-free Data Embedding," *4th Information Hiding Workshop*, LNCS vol. 2137, pp. 27-41, Apr. 2001.

Fridrich et al, Lossless Data Embedding—New Paradigm in Digital Watermarking, *EURASIP, Emerging Applications of Multimedia Data Hiding*, vol. 2002, No. 2, pp. 185-196, Feb. 2002.

Park et al, "Invertible semi-fragile watermarking algorithm distinguishing MPEG-2 compression from malicious manipulation," IEEE International Conference on Consumer Electronics, pp. 18-19, Jun. 2002.

Tian, "Wavelet-based reversible watermarking for authentication," Proc. SPIE, vol. 4675, pp. 679-690, Jan. 2002.

Tian, "Wavelet-based image compression and content authentication," Proc. SPIE, vol. 4551, pp. 11-20, Oct. 22, 2001.

Celik et al., "Reversible Data Hiding," Proc. Int. Conv. Image Processing, vol. II, Sep. 2002, pp. 157-160.

Celik et al, "Lossless Generalized-LSB Data Embedding," IEEE Trans. Image Processing, submitted for publication, Jul. 2002, 14 pages.

Fridrich et al., "Lossless Data Embedding—New Paradigm in Digital Watermarking," EURASIP J. Appl. Signal Processing, vol. 2002, No. 2, Feb. 2002, pp. 185-196.

Kalker et al, Capacity Bounds and Construction for Reversible Data Hiding, Proc. 14$^{th}$ Int. Conf. Digital Signal Processing, vol. 1, Jul. 2003, pp. 71-76.

Tian, "Reversible Watermarking by Difference Expansion," Proc. Workshop on Multimedia and Security, Dec. 2002, pp. 19-22.

Tian, "Reversible Data Embedding Using a Difference Expansion," IEEE Tran. Circuits and Systems for Video Technology, vol. 13, pp. 890-896, Aug. 2003.

* cited by examiner $\mathbf{u}_0 = (u_0, u_1, u_2, u_3)$
(a)

$\mathbf{u}_1 = (u_1, u_0, u_2, u_3)$
(b)

$\mathbf{u}_2 = (u_2, u_0, u_1, u_3)$
(c)

$\mathbf{u}_3 = (u_3, u_0, u_1, u_2)$
(d)

Fig. 4

TRANSFORMING DATA FILES INTO LOGICAL STORAGE UNITS FOR AUXILIARY DATA THROUGH REVERSIBLE WATERMARKS

RELATED APPLICATION DATA

This application is a continuation in part of U.S. patent application Ser. No. 10/319,404, filed Dec. 12, 2002, which claims the benefit of U.S. Application No. 60/404,181, filed Aug. 16, 2002, No. 60/340,651, filed Dec. 13, 2001, and No. 60/430,511, filed Dec. 2, 2002.

This application is also a continuation in part of U.S. patent application Ser. No. 10/319,380, filed Dec. 13, 2002, which claims the benefit of No. 60/430,500, filed Dec. 2, 2002.

This application is also related to application Ser. No. 10/035,830 filed Oct. 18, 2001, which claims the benefit of provisional applications:
a) No. 60/247,389, filed Nov. 8, 2000;
b) No. 60/260,907, filed Jan. 10, 2001; and
c) No. 60/284,594, filed Apr. 17, 2001.

The above listed applications are hereby incorporated by reference.

TECHNICAL FIELD

The invention relates to digital watermarking.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting, or line/character thickness variations), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. Nos. 10/319,404, 09/503,881 and U.S. Pat. No. 6,122,403, which are hereby incorporated by reference.

A particular class of digital watermarking, called reversible watermarking, enables the original host signal to be reconstructed. One example is disclosed in assignee's application Ser. No. 10/319,404, which describes a variety of methods for reversible watermarking of data, including a technique specifically referred to as difference expansion. Reversible watermarking has a number of applications, as illustrated in the patent documents incorporated above. In one application, a reversible watermark is used to verify that content in which it is embedded has not been altered. In particular, if the reversible watermark can be recovered and/or the content verified (e.g., via comparison of a hash of the perfectly restored content and a hash of original content carried in watermark), then the content is deemed authentic. Many proposed techniques focus on high data carrying capacity while maintaining fidelity of the content. Others propose making the watermark robust, and conditionally reversible in the event that the content has not been altered. For some applications, the reversible watermark can be used to degrade fidelity intentionally, and then restore high quality content through reversal of the watermark, assuming the content user has paid for, licensed, or otherwise been granted permission to access the high quality version.

The needs of a particular application vary, including the extent to which content quality is preserved, auxiliary data carrying capacity is maximized, and robustness is maintained.

The invention provides a software program, and related methods and systems that transform a host data file into a logical storage unit for auxiliary data files by embedding the auxiliary files in the data stored in the host data file. In one particular implementation, the program embeds auxiliary files in a reversible watermark. This reversible watermark modifies host data such as an image, audio, video, or software code, to carry auxiliary data. For perceptual content, the reversible watermark can maintain a desired level of perceptual quality, effectively hiding the auxiliary data in the host data. The reversible watermark enables the original host data prior to modifications due to the embedding to be restored.

One aspect of the invention is software for transforming a host data file carrying host media data into a logical storage unit for storing auxiliary data files in a reversible watermark embedded into the host media data. The software, stored on a storage medium, includes a watermarking module for modifying original values of host media data elements in the host data file to embed a reversible watermark carrying auxiliary data files. The reversible watermark enables the host media data elements to be restored to the original values. It also includes a user interface module for representing the host data files as a container for the auxiliary data files, and enables the adding or removing of auxiliary data files from the reversible watermark.

A variety of modules may be included in the software for providing additional functionality, including modules for determining capacity of the host data, partitioning the host data into randomly accessible storage units, displaying overlay files, executing links, such hyperlinks to related information, controlling access to the host data or embedded data layers, controlling distribution of the host, tracking the history of the host data, facilitating visual searching, controlling rendering of the host, etc.

Further features will become apparent from the following detailed description and accompanying drawings.

BRIEF DESCRIPTION OF THE DRAWINGS

FIG. 4 is a diagram illustrating an example of a permutation used for reversible watermark embedding.

DETAILED DESCRIPTION

1. Introduction

In this document, we describe a method for reversible watermarking and related applications. While the method is described for still images, it may be applied to other data sets, including audio, video, graphical models, text, and software (e.g., object code).

A reversible watermarking system includes an embedder and a reader. The embedder modifies the host data set to embed auxiliary data. In some applications, there is a desire to maintain some level of perceptual quality (e.g., embedding auxiliary data, yet making the resulting images or audio with embedded data look or sound substantially the same as the original image or audio). In this case, controls can be applied to ensure that a desired level of quality is maintained while maximizing the auxiliary data capacity, or maximizing the quality for a particular amount of auxiliary data. The reader analyzes a data set suspected of carrying embedded auxiliary data, extracts the auxiliary data, and restores the data set to its original values prior to embedding.

The method described below performs an expansion of values in a data set to embed auxiliary data. In the specific example provided for images, the method performs an invertible transform to convert the input data into a set that includes expandable data values. This transform is not necessary if the input data set is already in a form that includes sufficiently expandable data values to carry the desired amount of auxiliary data. In general, the transform attempts to create a set of values that maintains the perceptual quality of the host (for data sets where perceptual quality is important) and provides expandable values. One way to accomplish this is to exploit redundancy or correlation among values in the host signal by expanding the difference values between redundant or closely correlated values. One particular way to expand the difference values is detailed further below.

2. Generalized Difference Expansion

Figure 1:
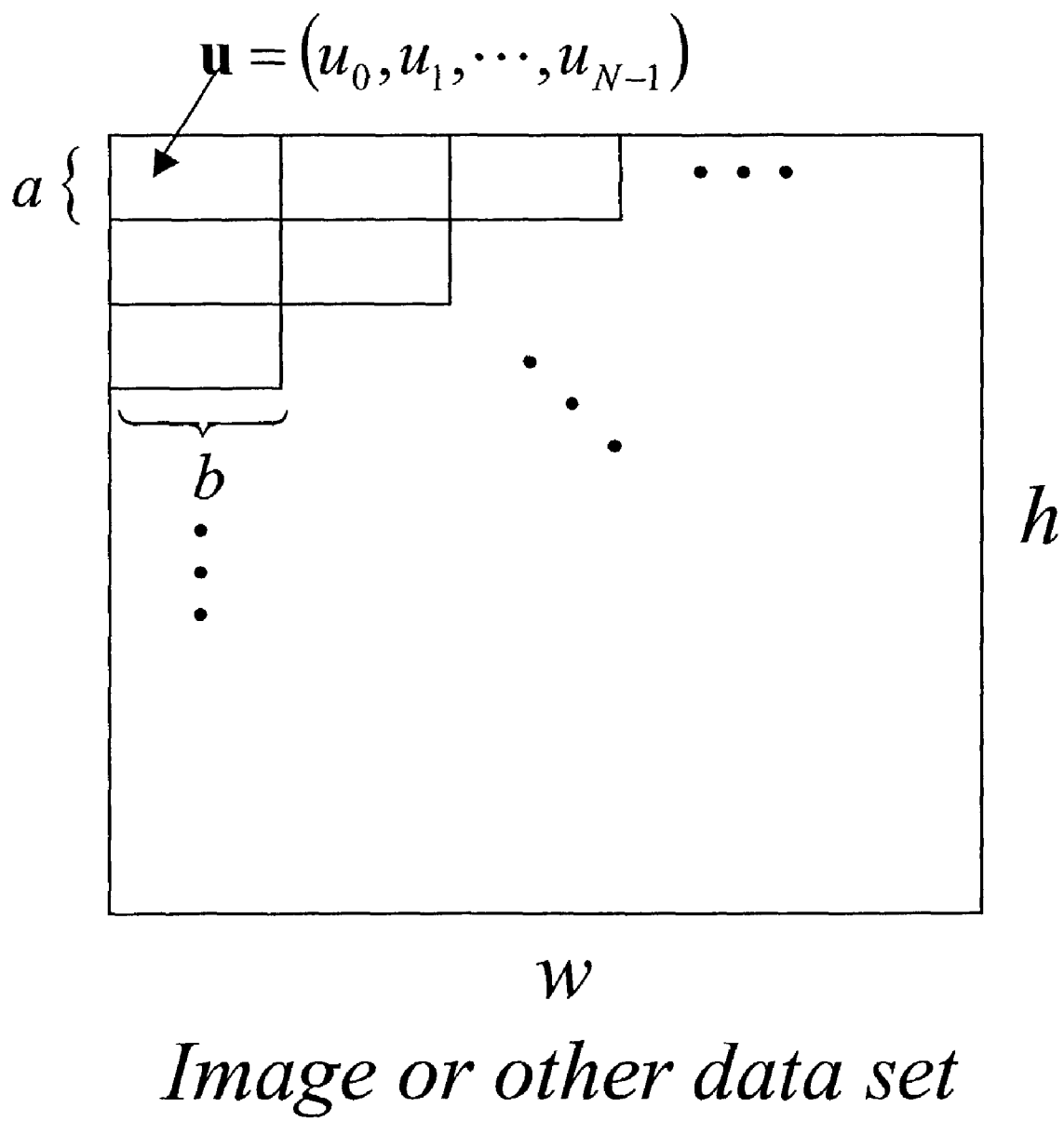
FIG. 1 illustrates an example of how to configure vectors for reversible watermarking.

Vector: For the purpose of this example, the vector $u=(u_0, u_1, \ldots u_{N-1})$ is formed from N pixel values chosen from N different locations within the same color component for an image according to a predetermined order. This order may serve as a security key. The simplest way to form this vector is to consider every a×b adjacent pixel values as shown in FIG. 1 as a vector. If w and h are the height and the width of the host image, then $1 \leq a \leq h$, $1 \leq b \leq w$ and $a+b \neq 2$.

For simplicity, we treat each color component independently, and, hence, each component has its own set of vectors. Also, we select vectors that do not overlap each other; i.e., each pixel exists in only one vector. These requirements may be removed at the expense of complicating the watermarking algorithm due to the extra caution required to determine the processing order of the overlapped vectors.

Forward Reversible Integer Transform: The forward reversible integer transform, $f(\bullet)$, for the vector $u=(u_0, u_1, \ldots u_{N-1})$ is defined as:

$$v_0 = \left\lfloor \frac{u_0 + u_1 + \cdots + u_{N-1}}{N} \right\rfloor \quad (1)$$

$$v_1 = u_1 - u_0$$

$$\vdots$$

$$v_{N-1} = u_{N-1} - u_0$$

where $\lfloor \bullet \rfloor$ is the least nearest integer.

The inverse transform, $f^{-1}(\bullet)$, for the transformed vector, $v=(v_0, v_1, \ldots, v_{N-1})$ is defined as:

$$u_0 = v_0 - \left\lfloor \frac{v_1 + v_2 + \cdots + v_{N-1}}{N} \right\rfloor \quad (2)$$

$$u_1 = v_1 + u_0$$

$$\vdots$$

$$u_{N-1} = v_{N-1} + u_0$$

Proof: To prove that equation (2) is the inverse of equation (1) one can substitute $v_0, v_1, \ldots, v_{N-1}$ from equation (1) into $u_0$ of equation (2). This gives:

$$u_0 = \left\lfloor \frac{u_0 + u_1 + \cdots + u_{N-1}}{N} \right\rfloor - \quad (3)$$

$$\left\lfloor \frac{(u_1 - u_0) + (u_2 - u_0) + \cdots + (u_{N-1} - u_0)}{N} \right\rfloor$$

$$= \left\lfloor \frac{u_0 + u_1 + \cdots + u_{N-1}}{N} \right\rfloor -$$

$$\left\lfloor \frac{u_0 + u_1 + \cdots + u_{N-1}}{N} - u_0 \right\rfloor$$

$$= \left\lfloor \frac{u_0 + u_1 + \cdots + u_{N-1}}{N} \right\rfloor -$$

$$\left\lfloor \frac{u_0 + u_1 + \cdots + u_{N-1}}{N} \right\rfloor + u_0 = u_0$$

Now, the reversibility concerning $u_1, u_2, \ldots, u_{N-1}$ can be proven by simple mathematical manipulation of $v_1, v_2, \ldots, v_{N-1}$ in equation (1).

Definition 1: The vector $u=(u_0, u_1, \ldots u_{N-1})$ is said to be expandable if for all values of $b_1, b_2, \ldots, b_{N-1} \in \{0,1\}$ $$0 \leq v_0 - \left\lfloor \frac{\tilde{v}_1 + \tilde{v}_2 + \cdots + \tilde{v}_{N-1}}{N} \right\rfloor \leq 255$$

$$0 \leq \tilde{v}_1 + v_0 - \left\lfloor \frac{\tilde{v}_1 + \tilde{v}_2 + \cdots + \tilde{v}_{N-1}}{N} \right\rfloor \leq 255 \quad (4)$$

$$\vdots$$

$$0 \leq \tilde{v}_{N-1} + v_0 - \left\lfloor \frac{\tilde{v}_1 + \tilde{v}_2 + \cdots + \tilde{v}_{N-1}}{N} \right\rfloor \leq 255$$

where:

$$v_0 = \left\lfloor \frac{u_0 + u_1 + \cdots + u_{N-1}}{N} \right\rfloor$$

$$\tilde{v}_1 = 2 \times v_1 + b_1 \quad (5)$$

$$\vdots$$

$$\tilde{v}_{N-1} = 2 \times v_{N-1} + b_{N-1}$$

Notice that each of $\tilde{v}_1, \tilde{v}_2, \ldots, \tilde{v}_{N-1}$ is one-bit left shifted version of the original value $v_1, v_2, \ldots, v_{N-1}$, respectively, but potentially with a different LSB (least significant bit). The conditions of equation (4), above, ensures that changing the LSBs of $v_1, v_2, \ldots, v_{N-1}$ according to equation (5) does not introduce an overflow or underflow in the values of $\tilde{u}_0, \tilde{u}_1, \ldots, \tilde{u}_{N-1}$ when the inverse transform is computed.

Definition 2: The vector $u=(u_0, u_1, \ldots, u_{N-1})$ is said to be changeable if, for all values of $b_1, b_2, \ldots, b_{N-1} \in \{0,1\}$, $\tilde{v}_1, \tilde{v}_2, \ldots \tilde{v}_{N-1}$ given by equation (6), below, satisfy equation (4).

$$v_0 = \left\lfloor \frac{u_0 + u_1 + \cdots + u_{N-1}}{N} \right\rfloor$$
$$\tilde{v}_1 = 2 \times \left\lfloor \frac{v_1}{2} \right\rfloor + b_1 \quad (6)$$
$$\vdots$$
$$\tilde{v}_{N-1} = 2 \times \left\lfloor \frac{v_{N-1}}{2} \right\rfloor + b_{N-1}$$

Notice that $\tilde{v}_1, \tilde{v}_2, \ldots, \tilde{v}_{N-1}$ in the above equation are the same as the original $v_1, v_2, \ldots, v_{N-1}$, but with different LSBs. Also, notice that a changeable vector remains changeable even after changing the LSBs of its $v_1, v_2, \ldots, V_{N-1}$. Also, from definitions 1 and 2, it can be observed that an expandable vector is also changeable.

This approach can be extended to embed an auxiliary data value with multiple states by shifting or multiplying the difference value by more than one bit position or a number greater than 2, respectively, as discussed in the patent documents incorporated above. Further, it can be extended to values other than difference values, and data types other than images.

2.1 Another Integer Transform

In this section, we describe an integer-to-integer vector transform based on averages and differences that is unique and exactly reversible for any integer vector. The transform is computed through the use of matrix operations including an inverse, and the floor and ceiling functions that round down or up to the nearest integer respectively. We show that even though the floor and ceiling functions introduce a non-linearity, when used in conjunction, they provide uniqueness and reversibility. Although there are many other matrix structures that can form a basis for integer transforms, we will focus here on the matrix structure that implements a difference expansion method.

Let D be a matrix that operates on an integer vector with the following 3 properties; (1) the matrix D is full rank, and the matrix-vector product results in (2) an average value of the integer vector, and (3) N–1 independent differences between vector elements. A weighted average where the weights sum to 1 is equally valid but will not be addressed in this document. For example, if N=4 and we reference all differences to the same (first) integer element, then one possible D is given by $$D = \begin{bmatrix} \frac{1}{N} & \frac{1}{N} & \frac{1}{N} & \frac{1}{N} \\ -1 & 1 & 0 & 0 \\ -1 & 0 & 1 & 0 \\ -1 & 0 & 0 & 1 \end{bmatrix}.$$

Note that to satisfy the full rank and N–1 difference properties, (1) there are exactly one (–1,1) pair in each row, and (2) each element of the integer vector is used to compute at least one difference.

The structure of the first column of $D^{-1}$ can now be completely determined by noting that $DD^{-1}=1$, the identity matrix. In this particular case, the first column of the identity matrix, i.e., a 1 followed by N–1 zeros, must be satisfied when D operates on the first column of $D^{-1}$. The inner product of the first row of D and the first column of $D^{-1}$ must be 1, and the inner product of each of the N–1 difference rows of D and the first column of $D^{-1}$ must generate a zero. Therefore, each element of the first column of $D^{-1}$ must be identical (to satisfy the element differences equal to zero) and the first column of $D^{-1}$ must be a column of 1's (to satisfy the inner product of the first row of D and the first column of $D^{-1}$ equal 1).

Next, let p be a vector of integer pixel values. Then the matrix-vector product, Dp, results in a vector that consists of the average, $\lfloor p \rfloor$, and N–1 integer differences. If we now examine the product, $D^{-1}$ Dp, we can establish the identity for any given $p_i$ as $p_i = \lfloor p \rfloor + (p_i - \lfloor p \rfloor)$, where the first $\lfloor p \rfloor$ comes from the first column of $D^{-1}$ and the bracketed expression comes from the remaining columns of $D^{-1}$.

Next, if we now apply the floor function (i.e., round down to nearest integer) to Dp to force integers, we get $D^{-1} \lfloor Dp \rfloor$, where $\lfloor \bullet \rfloor$ indicates the floor function. The identity for $p_i$ now becomes: $p_i = \lfloor \lfloor p \rfloor \rfloor + (p_i - \lfloor p \rfloor) = p_i + (\lfloor \lfloor p \rfloor \rfloor - \lfloor p \rfloor)$, where $-1 < (\lfloor \lfloor p \rfloor \rfloor - \lfloor p \rfloor) \leq 0$. Therefore, for any vector p, we get the identity $p = \lceil D^{-1} \lfloor Dp \rfloor \rceil$, where $\lceil \bullet \rceil$ indicates the ceiling function (i.e. round up to nearest integer). In sum, this difference expansion transform, and its inverse, provide a more general form of equations 1 and 2, and can be used in place of equations 1 and 2 in implementations of a reversible watermarking method.

As discussed in prior patent documents incorporated above, there are other possible reversible integer to integer transforms that may be used to produce a set of expandable values for carrying embedded data. In addition, the embedder may apply a series of reversible integer to integer transforms to the host data to produce a set of expandable values. The transforms applied in series may be recursive in the sense that a reversible transform is applied to the output of the previous iteration. In this case, the set of values produced by the last iteration of the transform is modified to embed auxiliary data, and then the transforms are reversed on the modified data in the reverse order of which they were applied. The transforms may also be many to one in the sense that the transform takes as input a vector of length N, and produces a set of potentially expandable values of N–1 or less.

To illustrate these options, consider the example where the generalized transform described in this section is applied recursively to the difference values, such that with each iteration, the absolute value of the difference values from the previous iteration are input to the next iteration of the reversible integer to integer transform. At the end of this series of transforms, the embedder has a set of potentially expandable values. The expandable values, x, are then modified (e.g., 2x+b, where b is an auxiliary data bit) to carry bits from an auxiliary bit stream.

This particular approach has a number of potential advantages. First, the changes made to embed data in the output of the series of transforms translates into smaller changes to the original elements of the host data set. As such, in the case of images for example, the perceptual distortion is lower. This approach provides a way to distribute the error associated with embedding auxiliary data over a wider number of host data elements than might be achieved by applying only one iteration of the integer to integer transform. Thus, if an implementer wishes to optimize perceptual quality vs. auxiliary data capacity, the reversible integer to integer transform can be applied repeatedly to generate a smaller set of expandable values. This approach also enables the embedder to produce a set of expandable values through extra iterations of a reversible transform, where one or fewer iterations of the transform yield no or an insufficient number of expandable values.

3. Example Method for Reversible Watermark

Let $I(i,j,k)$ be an RGB image, and assume that:
1. the pixel values in the red component, $I(i,j,0)$, are arranged into the set of 1×N vectors $U_R=\{u_l^R, l=1\ldots L\}$ using the security key $K_R$
2. the pixel values in the green component, $I(i,j,1)$, are arranged into the set of 1×N vectors $U_G=\{u_n^G, n=1\ldots N\}$ using the security key $K_G$
3. the pixel values in the blue component, $I(i,j,2)$, are arranged into the set of 1×N vectors $U_B=\{u_p^B, p=1\ldots P\}$ using the security key $K_B$.

Although it is not necessary, usually all color components in the image have the same dimensions and are processed using the same difference transform. This makes the number of vectors in the sets $U_R$, $U_G$, and $U_B$ to be the same (i.e., L=N=P). Let also the set $U=\{u_r, r=1\ldots R\}$ represent any of the above set of vectors $U_R$, $U_G$, and $U_B$, and K represent its associated security key. Also, let $V=\{v_r, r=1\ldots R\}$ be the transformation of V under the difference expansion transform $f(\bullet)$ (i.e. $V=f(U)$ and $U=f^{-1}(V)$). Also, let $u_r=(u_0, u_1, \ldots u_{N-1})$ and its difference expansion transform be $v_r=(v_0, v_1, \ldots, v_{N-1})$.

The vectors in U can now be classified into three groups according to the definitions given in Section (2), above. The first group, $S_1$, contains all expandable vectors whose $v_1 \leq T_1$, $v_2 \leq T_2$, ..., $v_{N-1} \leq T_{N-1}$, where $T_1$, $T_2$, ..., $T_{N-1}$ are predefined thresholds. The second group, $S_2$, contains all changeable vectors that are not in $S_1$. The third group, $S_3$, contains the rest of the vectors (not changeable). Also, let $S_4$ denote all changeable vectors (i.e., $S_4=S_1 \cup S_2$).

Let's now identify the vectors of $S_1$ using a binary location map, M, whose entries are 1s and 0s, where the 1 symbol indicates the $S_1$ vectors, and the 0 symbol indicates $S_2$ or $S_3$ vectors. Depending on how the vectors are formed, the location map can be 1- or 2-dimensional. For example, if vectors are formed from 2×2 adjacent pixels, the location map forms a binary image that has one-half the number of rows and one-half the number of columns as the original image. However, if a random key is used to identify the locations of the entries of each vector, then the location map is a binary stream of ones and zeros. The security key and an indexing table are needed in this case to map the zeros and ones in this stream to the actual locations in the image. Such a table is predefined and assumed to be known to both the embedder and the reader.

3.1. Embedding of Reversible Watermark

The embedding algorithm can be summarized using the following steps:
1. For every $U \in \{U_R, U_G, U_B\}$, do the following:
   a. Form the set of vectors U from the image $I(i,j,k)$ using the security key K.
   b. Calculate V using the difference expansion transform, $f(\bullet)$ (see equation (1)).
   c. Use V, equations (5) and (6), and the conditions in equation (4) to divide U into the sets $S_1$, $S_2$, and $S_3$.
   d. Form the location map, M; then compress it using a lossless compression algorithm, such as JBIG or an arithmetic compression algorithm, to produce sub-bitstream $B_1$. Append a unique identifier, EOS, symbol to $B_1$ to identify its end.
   e. Extract the LSBs of $v_1, v_2, \ldots v_{N-1}$ of each vector in $S_2$. Concatenate these bits to form sub-bitstream $B_2$.
   f. Assume the watermark to be embedded forms a sub-bitstream $B_3$, and concatenate sub-bitstreams $B_1$, $B_2$, and $B_3$ to form the bitstream B.
   g. Sequence through the member vectors of $S_1$ and $S_2$ as they occur in the image and through the bits of the bit-stream B in their natural order. For $S_1$, expand the vectors as described in equation (5). For $S_2$, expand the vectors as in equation (6). The values of $b_1, b_2, \ldots, b_{N-1}$ are taken sequentially from the bitstream.
   h. Calculate the inverse difference expansion transform of the resulting vectors using $f^{-1}(\bullet)$ (see equation (2)) to produce the watermarked $S_1^w$ and $S_2^w$.
   i. Replace the pixel values in the image, $I(i,j,k)$, with the corresponding values from the watermarked vectors in $S_1^w$ and $S_2^w$ to produce the watermarked image $I^w(i,j,k)$.

It should be noted here that the size of bitstream B must be less than or equal to N−1 times the size of the set $S_4$. To meet this condition, the values of the threshold $T_1, T_2, \ldots, T_{N-1}$ must be properly set. Also, it should be noted that the algorithm is not limited to RGB images. Using the RGB space in the previous discussion was merely for illustration purpose, and using the algorithm with other type of spectral images is straightforward.

3.2. Reading Watermark and Restoring Original Image

To read the watermark and restore the original image, the following steps must be followed:
1. For every $U \in \{U_R, U_G, U_B\}$, do the following:
   a. Form the set of vectors U from the image $I^w(i,j,k)$ using the security key K.
   b. Calculate V using the difference expansion transform, $f(\bullet)$ (see equation (1)).
   c. Use V, equation (6), and the conditions in equation (4) to divide the vectors in T into the two sets $\hat{S}_4$ and $\hat{S}_3$. $\hat{S}4$ has the same vectors as $S_4$, which was constructed during embedding, but the values of the entities in each vector may be different. Similarly, $S_3$ is the same set constructed during embedding, since it contains non-changeable vectors.
   d. Extract the LSBs of $\tilde{v}_1, \tilde{v}_2, \ldots, \tilde{v}_{N-1}$ of each vector in $\hat{S}_4$, and concatenate them to form the bitstream B, which is identical to that formed during embedding.
   e. Identify the EOS symbol and extract sub-bitstream $B_1$. Then, decompress $B_1$ to restore the location map M, and, hence, identify the member vectors of the set $S_1$ (expandable vectors). Collect these vectors into set $\hat{S}_1$.
   f. Identify the member vectors of $S_2$. They are the members of $\hat{S}_4$ who are not members of $\hat{S}_1$. Form the set $\hat{S}_2=\hat{S}_4-\hat{S}_1$.
   g. Sequence through the member vectors of $\hat{S}_1$ and $\hat{S}_2$ as they occur in the image and through the bits of the bit-stream B in their natural order after discarding the bits of $B_1$. For $\hat{S}_1$, restore the original values of $v_1, v_2, \ldots, v_{N-1}$ as follows:

$$v_1 = \left\lfloor \frac{\tilde{v}_1}{2} \right\rfloor, v_2 = \left\lfloor \frac{\tilde{v}_2}{2} \right\rfloor, \cdots, v_{N-1} = \left\lfloor \frac{\tilde{v}_{N-1}}{2} \right\rfloor \quad (7)$$

For $\hat{S}_2$, restore the original values of $v_1, v_2, \ldots, v_{N-1}$ according to equation (6). The values of $b_1, b_2, \ldots, b_{N-1}$ are taken sequentially from the bitstream.
   h. Calculate the inverse difference expansion transform of the resulting vectors using $f^{-1}(\bullet)$ (see equation (2)) to restore the original $S_1$ and $S_2$.
   i. Replace the pixel values in the image $I^w(i,j,k)$ with the corresponding values from the restored vectors in $S_1$ and $S_2$ to restore the original image $I(i,j,k)$.

j. Discard all the bits in the bit-stream B, which were used to restore the original image. Form the sub-bitstream $B_3$ from the remaining bits. Read the payload and authenticate the image using the watermark contained in $B_3$. For example, recomputed a hash of the restored image and compare this recomputed hash with a hash stored in the embedded bit-stream.

4. Payload Size

To be able to embed data into the host image, the size of the bitstream B is less than or equal to N−1 times the size of the set $S_4$. This means that $$\|S_1\| + \|S_2\| = \frac{\|B_1\| + \|B_2\| + \|B_3\|}{N-1} \quad (8)$$

where $\|x\|$ indicates number of elements in x. But $\|B_2\|=(N-1)\|S_2\|$; hence, equation (8) can be reduced to $$\|B_3\|=(N-1)\|S_1\|-\|B_1\| \quad (9)$$

For the case where N=2, the bit-stream size is $\|B_3\|=\|S_1\|-B_1\|$.

Equation (9), above, indicates that the size of the payload that can be embedded into a given images depends on the number of expandable vectors that can be selected for embedding and on how well their location map can be compressed. With w×h host image, the algorithm would generate $$\frac{w \times h}{N}$$

vectors. Only a portion, α (0≦α≦1), of these vectors can be selected for embedding; i.e., $$\|S_1\| = \alpha \frac{w \times h}{N}.$$

Also, the algorithm would generate a binary map, M, containing $$\frac{w \times h}{N}$$

bits. This map can be losslessly compressed by a factor β(0≦β≦1). This means that $$\|B_1\| = \beta \frac{w \times h}{N}.$$

Ignoring the unchangeable vectors (i.e., assuming $\|S_3\|=0$) and using equation (9), the potential payload size (in bits) becomes, $$\|B_3\| = (N-1)\alpha \frac{w \times h}{N} - \beta \frac{w \times h}{N} \quad (10)$$

$$= \left(\frac{N-1}{N}\alpha - \frac{1}{N}\beta\right) \times w \times h$$

Equation (10), above, indicates that the algorithm is effective when N and the number of selected expandable vectors are reasonably large. In this case, it does not matter if the binary map, M, is difficult to compress (this is because its size is very small). But, when each vector is formed from N consecutive pixels (row- or column-wise) in the image, and N is large, the number of expandable vectors may substantially decrease; consequently, the values of the thresholds $T_1, T_2, \ldots, T_{N-1}$ must be increased to maintain the same number of selected expandable vectors. This causes a decrease in the quality of the embedded image. Such a decrease can be ignored by many applications, since the embedding process is reversible and the original image can be obtained at any time. In this case, the algorithm becomes more suitable for low signal-to-noise ratio (SNR) embedding than for high SNR embedding. To maximize $\|B_1\|$ for high SNR embedding, N must either be kept relatively small or each vector must be formed from adjacent pixels in two-dimensional area in the image. The quad (N=4) structure given in the next section satisfies both requirements simultaneously.

When $$\alpha \leq \frac{\beta}{N-1},$$

the payload size in equation (10) becomes negative. In this case, nothing can be embedded into the image. This scenario is less likely to happen with natural images. Most loss-less compression algorithms can achieve a 2:1 compression ratio $$\left(i.e., \beta = \frac{1}{2}\right).$$

In this case, α must be greater than $$\frac{1}{2(N-1)}$$

to be able to embed a non-zero payload. This is can be easily satisfied when N>2. For the case where N=2, the payload size becomes $$\|B_3\| = \left(\frac{\alpha}{2} - \frac{\beta}{2}\right) \times w \times h \quad (11)$$

Equation (11), above, suggests that the ratio of selected expandable pairs, α, has to be much higher than the achievable compression ratio, β, in order for this case to be effective. Since pairs of pixels are used as vectors, the correlation of the pixels in each pair is expected to be very high in natural images. This makes the pair easier to satisfy smaller thresholds, and, hence, to produce a large portion of selected expandable pairs. One approach is to apply the algorithm row-wise, then column-wise, in order to almost double the amount of data that can be embedded into the host image.

5. Rate Controller

For a given vector size, N, the payload size that can be embedded into an image and the quality of the resulting image is solely determined by the host image itself and by the value of the thresholds used. However, many practical applications embed a fixed-size payload regardless of the nature of the host image. Hence, an automatic data-rate controller is necessary to adjust the value of the thresholds properly and to compensate for the effect of the host image. The iterative feedback system depicted in FIG. 2 can be used for this purpose.

Figure 2:
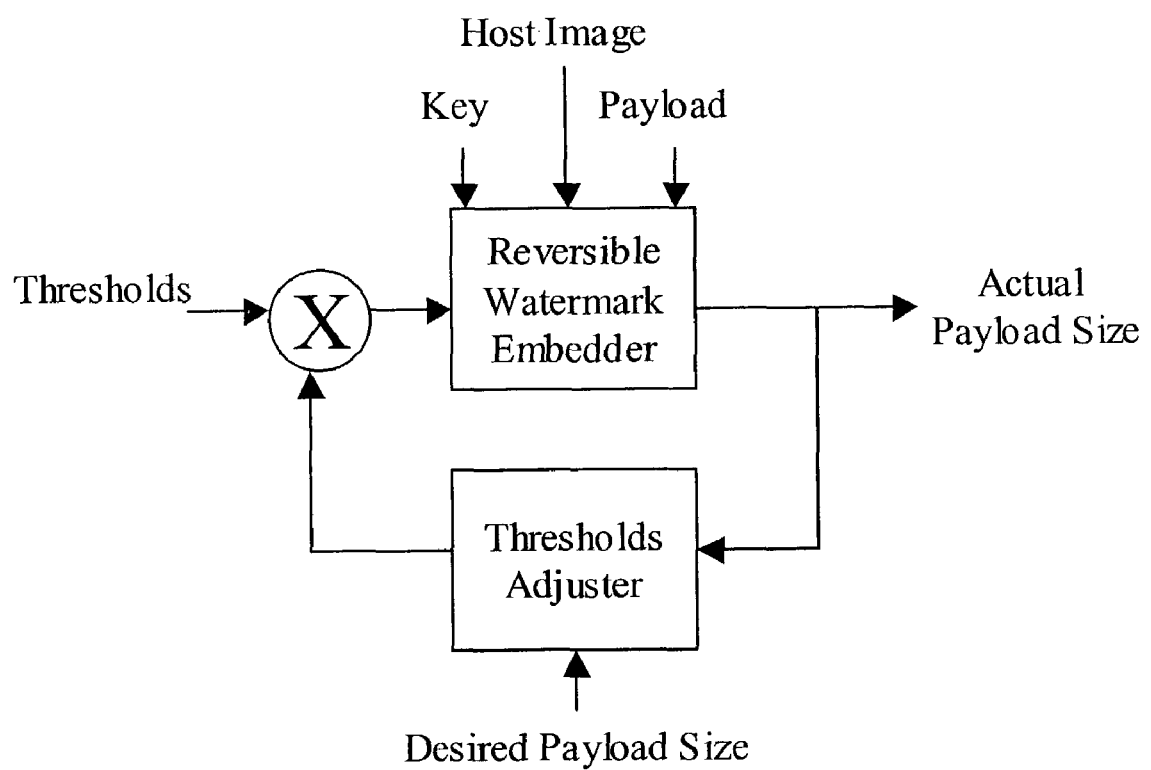
FIG. 2 is a diagram of a rate controller for use in reversible watermarking.

FIG. 2 illustrates a control system with a feedback loop. This system attempts to minimize the distortion to the host signal for a desired payload size. A similar system may be used to maximize the payload size for a desired amount of perceptual distortion. Finally, a system that satisfies both a perceptual distortion constraint can a auxiliary data capacity constraint may be made by constructing a control system that is a function of both constraints.

The control system fits the error signal to a function to modify the thresholds. The error signal may be the difference between the desired payload and the actual payload, or the desired perceptual quality and the actual perceptual quality. The perceptual quality may be measured using a measure of distortion between the original and host signal, including, for example, using human visual system models (e.g., the Watson metric as described in U.S. Pat. No. 5,629,780, a Just Noticeable Difference Metric such as the JNDMetrix™ Technology from Sarnoff Corp. and as described in U.S. Pat. Nos. 6,360, 022, 6,285,797, 5,974,159, 5,719,966 and 5,694,491), or human audibility system models (e.g., models used in audio compression such as MPEG coding AAC) in the case of embedding in audio. The perceptual model can be used to generate a mask that controls the amount of or sets a threshold for changes to values of the host data set. This mask can be computed as a function of the host data set alone, or as a function of the host data set and the host data set with auxiliary data embedded. With each iteration of embedding, the perceptual model can be applied to measure the perceptual quality of the embedded data set relative to a reference data set (such as the previous embedded version or the original host data). At each iteration, the perceptual model can also provide a mask for controlling the amount of changes to the host data set or value representing quality of the embedded data set for use in the control system.

If $T(n)=[T_1(n), T_2(n), T_{N-1}(n)]$ is the thresholds vector at the $n^{th}$ iteration, and C is the desired payload length, then the following proportional feedback controller can be used:

$$T(n)=T(n-1)-\lambda(C-\|B_3\|)T(n-1) \quad (12)$$

where $0<\lambda<1$ is a constant that controls the speed of convergence. T(0) is a pre-set value that reflects the relative weights between the entities of the vector used in the difference expansion transform.

An alternative feedback controller is:

$$T(n)T(n-1)-\lambda'(Q-q)T(n-1) \quad (13)$$

Where Q represents the desired quality and q represents the current quality as measured by a perceptual quality metric. $T'(n)=[T_1'(n), T_2'(n), \ldots T_{N-1}'(n)]$ is the thresholds vector at the $n^{th}$ iteration.

There are at least two approaches for introducing a perceptual quality metric into these control system. One approach, for images, is to use the visual quality model to compute a perceptual model threshold map for the host image, and then use a table to map this perceptual model threshold map to the thresholds vector, using the mapped thresholds as a constraint for the threshold vector used in the control system. Another approach is to introduce the perceptual model in $\lambda$ where $\lambda(T, \Delta T, Q_{metric})$.

To combine the payload and perceptual quality constraints, the threshold vectors from equations (12) and (13) can be combined (e.g., through a weighting function that applies a desired preference to capacity or quality) to form a single composite threshold vector.

6. Recursive and Cross-Spectral Embedding

Figure 3:
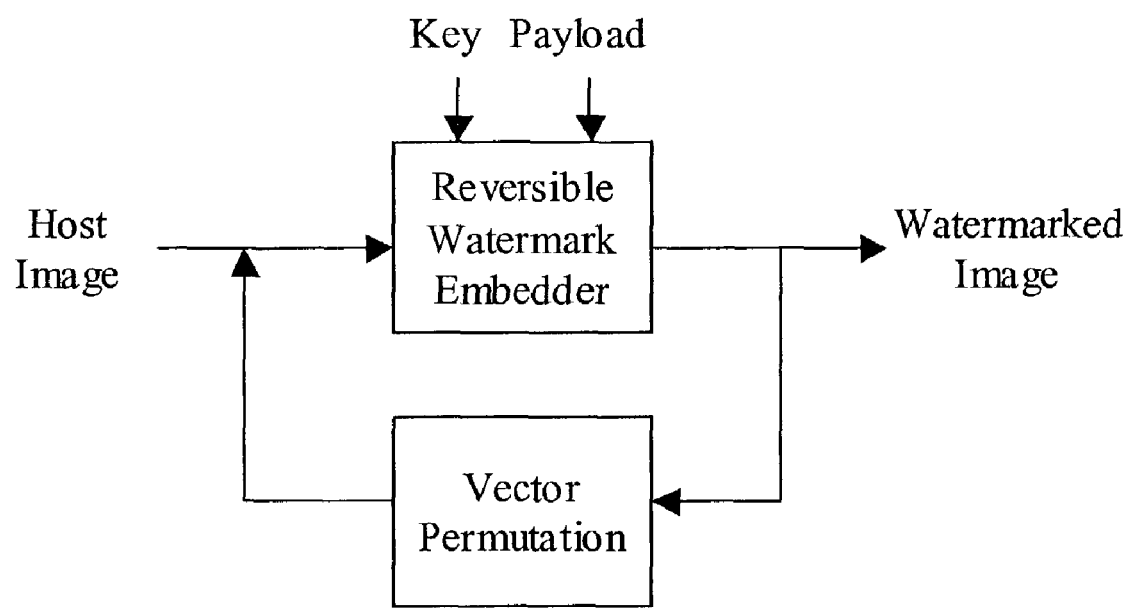
FIG. 3 is a diagram illustrating recursive embedding of a reversible watermark.

Applying the algorithm recursively as in FIG. 3 can increase its hiding capacity. This is possible because the proposed watermark embedding is reversible, which means that the input image can be exactly recovered after embedding. However, the difference between the original image and the embedded images increases with every application of the algorithm. At one point this difference becomes unacceptable for the intended application. Most applications, however, have a high tolerance to this error, since the original image can always be recovered exactly. To reduce the perceptibility of the error introduced by each layer, the embedder is implemented such that it distributes the error more evenly across the host signal to avoid a concentration of error at particular locations, which might become perceptible.

One potential way to distribute the error when the algorithm is applied recursively is to use permutations of the entities of the input vector, which is depicted in FIG. 4. for quad vectors. The figure suggests four difference quad structures, each of which can be used in a different iteration for a total of four iterations. For $u_0$, the difference expansion of equation (1) is performed based on $u_0$, so the closer $u_0$ is to $u_1$, $u_2$, and $u_3$, the smaller the difference is, and, hence, the smaller the embedding error is. Similarly, for $u_1$, $u_2$, and $u_3$ the difference expansion will be based on $u_1$, $u_2$, and $u_3$, respectively. This allows the algorithm to completely exploit the correlation within a quad.

To hide even more data, the algorithm can be applied across spectral components after it is applied independently to each color component. In this case, the vector u contains the color components (R, G, B) of each pixel arranged in a predefined order. This can be done either as cross-spectral triple u=(R, G, B) or as cross-spectral quad U=(R, G, G, B), or permutation thereof. For the cross-spectral quad arrangement, the integer difference expansion transform becomes:

$$v_0 = \left\lfloor \frac{R + 2G + B}{4} \right\rfloor \quad (14)$$
$$v_1 = R - G$$
$$v_2 = B - G$$

$$G = v_0 - \left\lfloor \frac{v_1 + v_2}{4} \right\rfloor \quad (15)$$
$$R = v_1 + G$$
$$B = v_2 + G$$

which is the reversible component transform proposed in JPEG2000 for color conversion from RGB to YUV.

Although, the spirit of the payload size analysis of section (4) applies to the cross-spectral vectors, the results need some modification. This is because only two bits are embedded per cross-spectral triplet or quad, rather than N−1, and the number of vectors, in this case, equals the area of the location map, which equals the area of the original image. Hence, $$\|B_3\|=2\|S_1\|+\|B_1\|$$

$$\|B_3\|=(2\alpha-\beta)\times w\times h \quad (16)$$

We implemented the algorithm detailed above and tested it with spatial triplets, spatial quads, cross-color triplets, and cross-color quads with $a_0=a_1=\ldots=a_{N-1}=1$. In all cases, we used a random binary sequence derived from a uniformly distributed noise as a watermark signal. We tested the algorithm with the common 512×512 RGB test images: Lena, Baboon, and Fruits. We set $T_1=T_2=T_3$ in all experiments.

A spatial triplet is a 1×3 or 3×1 vector formed from three consecutive pixel values in the same color component row- or column-wise, respectively. We applied the algorithm recursively to each color component: first to the columns and then to the rows. The achievable embedding capacity depends on the nature of the image itself. Some images can bear more bits with lower distortion in the sense of PSNR than others. Images with a lot of low frequency contents and high correlation, like Lena and Fruits, produce more expandable triplets with lower distortion (in the PSNR sense) than high frequency images, such as Baboon, and, hence, can carry more watermark data at higher PSNR.

In general, the embedded images hardly can be distinguished from the original. However, a sharpening effect can be observed when the original and the embedded images are displayed alternatively. This effect is more noticeable at lower PSNR than at higher PSNR.

A spatial quad was assembled from 2×2 adjacent pixels in the same color component as shown in FIG. 4a. We applied the algorithm to each color component independently. Our experiments indicate that the achievable embedding capacity depends on the nature of the image itself. The algorithm performs with Fruits and Lena much better than Baboon, and it performs slightly better with Fruits than with Lena. With Fruits, the algorithm is able to embed 867 kbits with image quality of 33.59 dB. It is also able to embed 321 kbits with high image quality of 43.58 dB. Nevertheless, with Baboon the algorithm is able to embed 802 kbits at 24.73 dB and 148 kbits at 36.6 dB.

In our experiments, we estimate that the achievable payload size for the spatial quad-based algorithm is about 300,000 bits higher than for the spatial triplets-based algorithm at the same PSNR, and the PSNR is about 5 dB higher for spatial quad-based algorithm than for spatial triplet-based algorithm at the same payload size. Also, the spatial quad-based algorithm has finer control over the payload size and the PSNR than the spatial triplet-based algorithm. For example, it was possible to produce images at PSNRs in the 38 dB to 46 dB range with spatial quad-based algorithm, but not with spatial triplet-based algorithm. This result is because 2×2 spatial quads have higher correlation than 1×3 spatial triplets and because the single location map used by the spatial quad-based algorithm is smaller than each of the two location maps used by the spatial triplet-based algorithm (one location map for each pass).

In general, the quality of the embedded images is better than that obtained by the algorithm using spatial triplets. Also, the sharpening effect is less noticeable.

The cross-color triplets and quads were formed from the RGB values of each pixel, as described above. Our experiments show that the achievable payload size and the PSNR using cross-color vectors are much lower than those using spatial vectors. Hence, for a given PSNR level, we observed that it is better to use spatial vectors than cross-color vectors.

Our results show that the cross-color triplet-based algorithm has almost the same performance as the cross-color quad-based algorithm with all test images except Lena at PSNR grater than 30. While the cross-color triplet-based algorithm was able to embed small payloads at these higher PSNRs, the cross-color quad-based algorithm was not. Upon closer inspection of the Lena image, we noticed that the blue channel of Lena is very close to the green channel. Also, upon further inspection of the cross-color triplet-based and cross-color quad-based transforms, we noticed that when the red or blue channel is close in value to the green channel, the dynamic range of G after expansion according to equation (5) becomes wider for the cross-color quad-based transform than for the cross-color triplet-based transform. Hence, in this case, the cross-color triplet-based algorithm has the potential of producing more expandable vectors and a location map of less entropy than the cross-color quad-based transform. And, indeed, this was the case with the Lena image.

Interleaving

Another method for iteratively embedding multiple layers into a data set is called interleaving. This method interleaves selected pairings of data values on which to perform difference expansion. Here's an example for iterative embedding of layers into an image:

[1] first layer: reversible watermarking on the horizontal pairing pattern with pixel coordinates (i,2*j−1) and (i,2*j)
[2] second layer: reversible watermarking on the horizontal pairing pattern (i,2*j), (i,2*j+1)
[3] third layer: reversible watermarking on the vertical pairing pattern (2*i−1,j), (2*i,j)
[4] fourth layer: reversible watermarking on the vertical pairing pattern (2*i,j), (2*i+1,j)

In a prior approach, we performed multi-layer embedding as follows: layer[1] followed by layer[3], then layer[1], layer [3], and so on.

We experimented by comparing results of this and the prior approach on the Lena test image using the scalar difference expansion (pair of two pixels). Starting at about 40 dB, the interleaving approach proposed above gives a higher PSNR than the prior approach. Also the embedding capacity is increased from 2.0 bits/pixel to 2.5 bits/pixel.

This interleaving approach may be used in combination with the other multi-layer approaches discussed above. As detailed above, we have generalized the expansion method to apply to vectors of arbitrary length N. When the reversible watermarking method is applied iteratively to embed two or more layers, the positions of the elements of the vectors selected for each layer can be overlapped and/or interleaved in a variety of ways to obtain a desired embedding capacity and/or quality level.

Program to Transform Data Files into Logical Storage Unit for Auxiliary Data

The reversible watermarking method, or other reversible watermarking method, may be implemented as a computer program that transforms a data file (or defined collection of files) into a data structure acting as storage for auxiliary data files. In particular, the program transforms a host data file, or a collection of files, into a logical storage unit, e.g., one that appears as a hard disk through the interface of the program. This program may be designed to store a variety of files and data types in a host image, audio, video, text or object code file. In the case of perceptual data, such as audio, video, graphics, or images, the program retains perceptual quality of the audio, video, graphics or images stored in the host file to a desired level, and retains the format of the perceptual data. As such, standard applications used to view or render output from the file can still be used to view or listen to the host data, notwithstanding the presence of embedded files in the host data.

For applications where the host data file carries codes whose meaning is changed due to the reversible watermark embedding, such as software code or text representations like ASCII, the file can still retain its same format after embedding, yet the altered data is restored to its original, unmodified form before use.

For the sake of this discussion, we illustrate an example of the program particularly adapted for images, which transforms image files in a standard format like GIF or TIF into a file storage unit that retains the perceptual quality and file format of the host image through the interface of the program.

Though the use of the difference expansion method is not required, it has the advantage that it segregates an image into an average, which remains fixed, and expanded difference values, enabling the average part to provide thumbnail images that are identical to thumbnails generated from the original image. Users can view files that act as storage disks on their hard drives or some other storage location as if they have been unmodified. In addition, the user gains the convenience that all of the functionality and data associated with files embedded in the host image are all in the same location of the host image. Thus, when the user finds a desired image on a computer system (e.g., using a typical file browser that is part of the operating system) and selects it for opening the file (e.g., double clicks on the file icon in the file browser window) all of the functionality and data associated with the files embedded in that image are available automatically.

From the standpoint of file size, the reversible watermarking method typically makes the host image less compressible. However, the extra space needed to store a host file with embedded files is, at least in part, compensated by the space savings created by carrying other files within the host image. In addition, the host file may be subject to a lossy compression/decompression process to maximize its embedding capacity for the particular reversible watermarking method. Examples of such lossy compression methods include wavelet based methods such as JPEG 2000. In the case of the difference expansion method of reversible watermarking, this pre-processing is designed to increase inter-pixel correlation in the image such that the inter-pixel differences are smaller, and thus, more expandable. The auxiliary files to be embedded in the host image may be compressed as well before being inserted into the host image.

Figure 5:
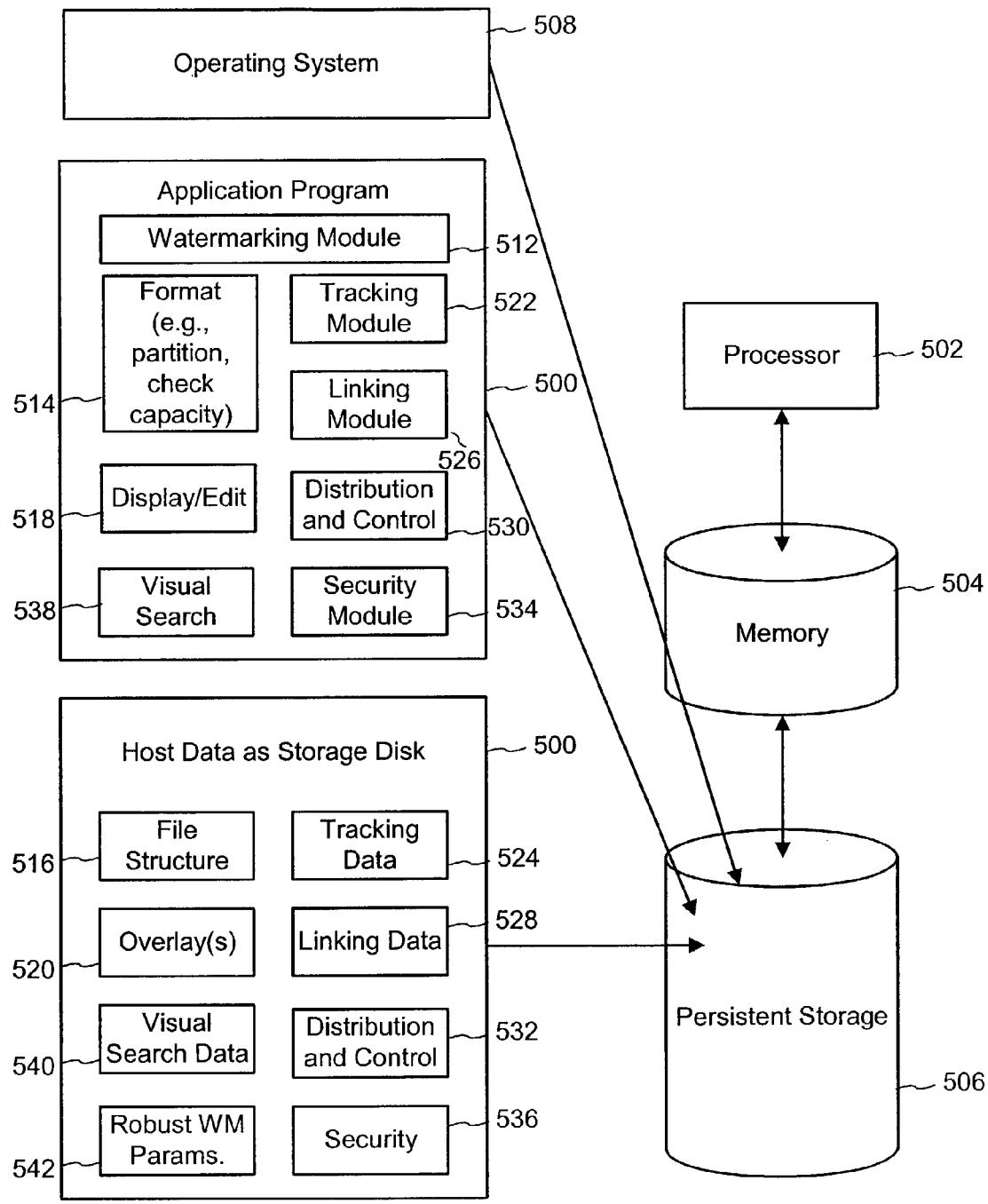
FIG. 5 is a diagram illustrating an example of a program used to transform a host data file into a logical storage unit using a reversible watermark.

FIG. 5 is a diagram illustrating an example of a program used to transform a host image file into a storage unit. In this example, the program is implemented as an executable application program 500. It also may be implemented as a plug-in module, set of modules, or library that is integrated or linked into another application program or operating system. In a typical user installation, this application program resides on a computer system, which includes a processor 502, memory 504, persistent storage 506 (e.g., a hard disk), and other peripherals, such as a keyboard, cursor control device, display, printer, audio and video card, etc. The application program is installed in the persistent storage, and is loaded into computer memory for execution by the processor. The application program operates in conjunction with an operating system 508, which provides basic computing services such as file browsing, process scheduling, file system, input/output services, graphical user interface, etc.

The application program preferably operates on image files 510 in a standard format, like TIF or GIF, so that other applications can make use of the files after embedding. These image files are stored in persistent storage 506, and are loaded into memory for processing. The application program includes a number of functional component modules. Some of these components manage particular types of embedded data in the host data file. Below, we describe the component and the corresponding data in the host file that it manages.

Embedding, Reading, Restoring

The primary function of the program is to implement the reversible watermark embedding, reading, and original image restoring functions. We have detailed one reversible watermark method above that performs these functions, but others may be substituted.

The watermarking module 512 implements reversible watermarking functions. It operates in conjunction with the other code modules in the program to form an auxiliary bit stream for embedding in the host data set. It also extracts the embedded data stream, and restores the host data to its original unmodified state.

Format "Image as Disk"

A formatting module 514 performs functions to prepare a host data file for embedding. These functions include:
- checking the auxiliary data carrying capacity (e.g., using rate control analyzer described above),
- pre-compressing the image to increase data carrying capacity, and
- partitioning the image into fixed or image dependent regions (e.g., based on image quality constraints, embedding capacity constraints, regions of interest to be purposefully modified or left unmodified, etc.)

The partitioning enables the program to provide a form of randomly accessible storage locations within the host data set corresponding to regions in the host. Also, or alternatively, it enables localized control of embedding capacity and perceptual quality constraints, region by region. This partitioning enables the different partitions to be formatted as different logical storage units or "folders" for entirely separate, and independently embedded auxiliary bit streams. Each partition can store different file or files and be accessed randomly and independently via different access control, such as different passwords and/or biometric data used to generate a key for decoding a reversible watermark from the particular partition that it pertains to. In the case where multiple reversible watermark layers are embedded, the last level embedded (also the first decoded) can be used to store the information on variable partitioning, enabling the program to extract the location of the partitions from the embedded reversible watermark layer, and then randomly access information from each partition. Of course, if the partitioning is fixed, either by using fixed patterns for partitioning the host data, or by using host data features that are expected to remain fixed, then the partitioning information need not be embedded.

Lossy and lossless compression utilities may also be included or may be provided separately to compress data files before embedding them in the host data file.

The formatting module also provides file system functions for managing the embedded data. The structure of the embedded files, including file names, sizes and location within the embedded bit stream are stored in the file structure 516. To save embedding capacity, the file structure can be implemented using delimiters in the embedded bit stream.

Display/Edit/Overlays

The display/editor module 518 controls display of the host signal (with or without embedded data), and other related images, such as thumbnails, overlays, etc. To display the original, unmodified host image, it invokes the reading and restoring components of the reversible watermarking module to reconstruct the original image. It also includes a graphical user interface for the program that depicts the host data in the host data file as a container for auxiliary data files stored in the reversible watermark.

Figure 6:
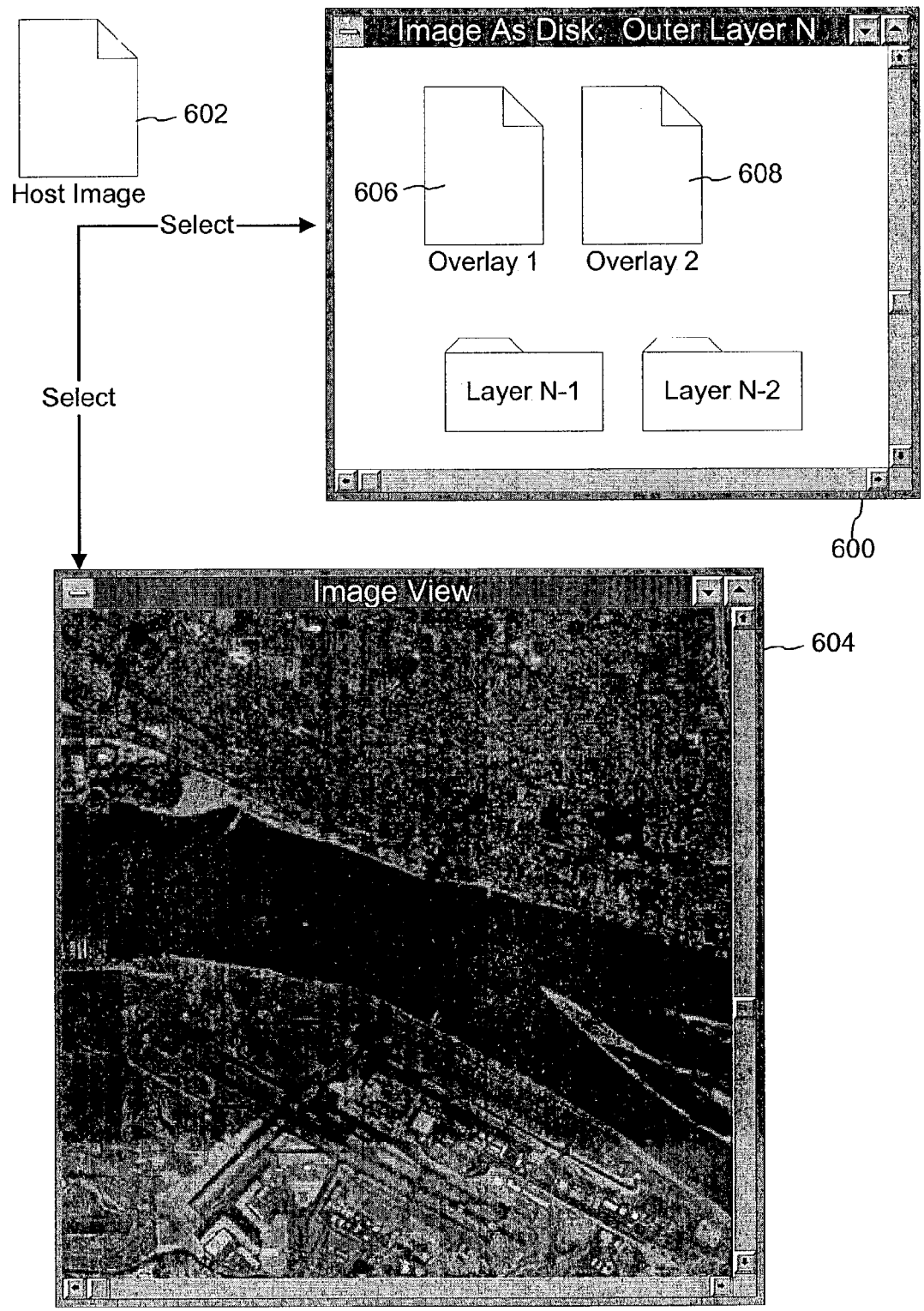
FIG. 6 is a diagram illustrating an example of a graphical user interface for the program illustrated in FIG. 5.
Figure 7:
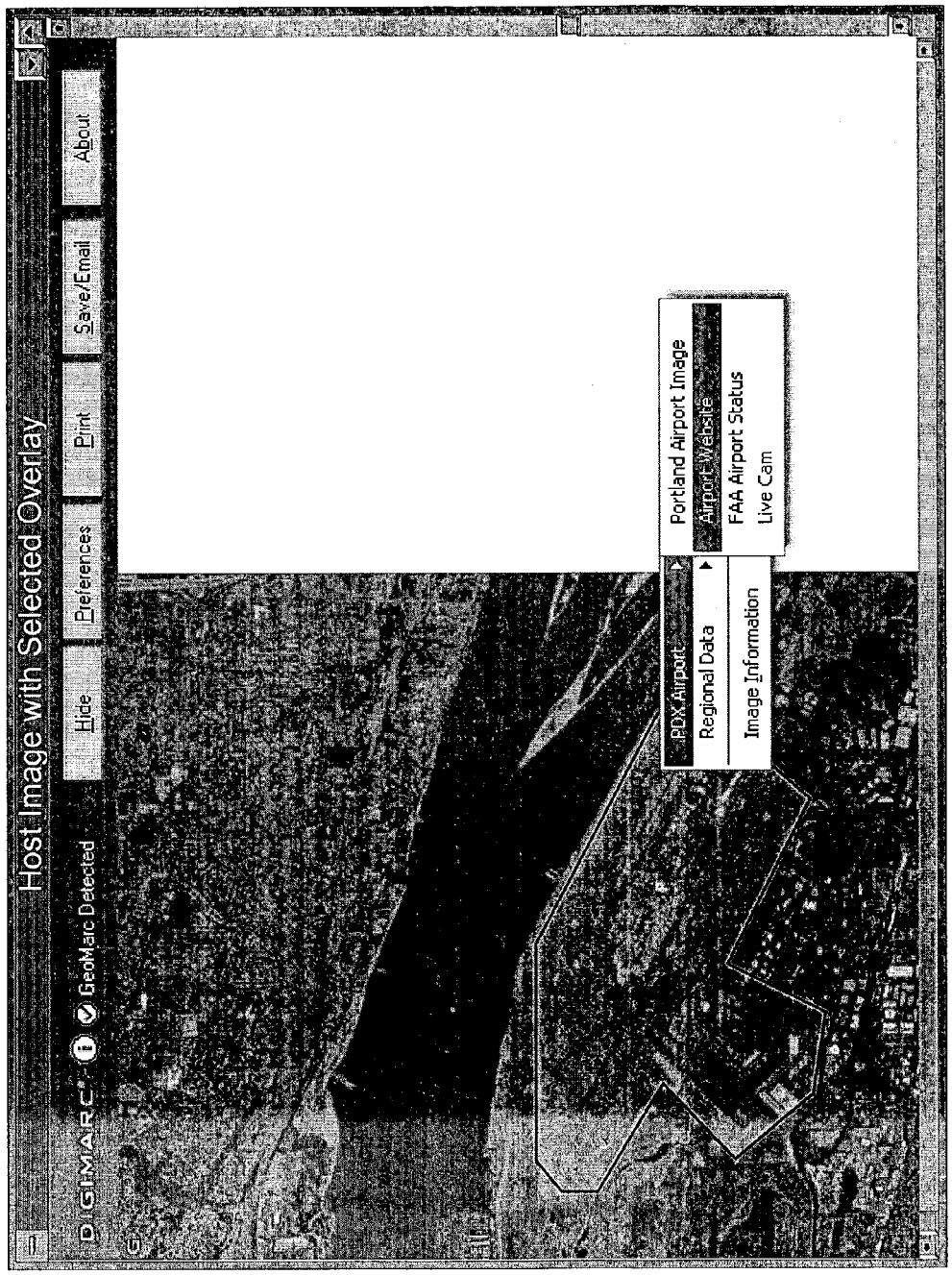
FIG. 7 is a diagram illustrating an example of a user interface used to depict overlays that are extracted from a reversible watermark and superimposed over a host image, along with links to related information.

FIGS. 6-7 are diagrams illustrating an example of the graphical user interface 600. In this implementation, the program displays this interface 600 when a user selects (e.g., double clicks) on a graphical representation of a host data file 602 stored on the computer's file system using the file browser of the operating system, or when the user selects the program using the operating system, and then selects a file open command on a host data file. At the same time, the program displays a view of the host image in a separate window 604 as shown in FIG. 6. Thus, by simply selecting a host file, the program automatically provides the user with an interface 600 for viewing/changing the embedded data files, as well as a host image viewer interface 604 for viewing the host data.

This user interface 600 enables the user to add or remove files from the container by dragging and dropping files to and from the window. When files are added or removed from the container, the program formats them for embedding in a reversible watermark layer, or layers, depending on user's instructions and available auxiliary data capacity per layer. When the user has finished selecting auxiliary data for embedding and wishes to have the host data file, the program invokes the watermarking module to embed the auxiliary data. When the user wishes to extract auxiliary data, the program first prompts the user for applicable passwords, and then proceeds to extract at least a first layer including information about the embedded data files. It then displays them in a user interface window depicting the files stored within the host data file such as the interface 600 shown in FIG. 6. The user can select individual files in this window (e.g., with a mouse), and in response, the watermarking module extracts these files and invokes any associated functionality.

For example, when the user selects an overlay in the interface 600, the program automatically gets the overlay from the embedded data (which may have been previously extracted upon file opening), superimposes it over the host image, and displays the result as shown in FIG. 7. The graphical representations of the overlay files 606, 608 may be shown as simple file icons representing a generic overlay, or as thumbnail images of the specific overlay graphic in the overlay file (e.g., low resolution versions of the overlay graphic). As shown in FIG. 7, the overlay highlights a region of the host image in this example. It also has associated links (e.g., to another website or to related information) that the user may select to activate a browser and fetch the linked web page at the URL stored in the link file embedded in the host image.

It also manages other display functions such as superimposing related overlay images, such as overlay images that are embedded in the host image. The display component automates overlays rather than requiring the user to piece them together from disparate files stored separately. When the user opens the image for viewing, an option window informs the user that the image has overlays. The user can then select the overlays, and in response, the display component superimposes them onto the display of the host image.

Another related feature is visible change detection, where changes made by a particular user are highlighted on the image in the region where the change occurred. These change markings may be implemented as an overlay image (stored either as a compressed bitmap or vector graphic including coordinates where the changes occurred). These change markings can also be cross-referenced with tracking data described below to track who made the changes, when the changes were made, and where the changes were made.

Another related feature is the use of other graphical structures or image overlays to introduce interactivity or animation in the image. Consider the case where the host image represents a business card, company brochure, product diagram, instruction manual, installation manual, or other marketing document. In this case, the display component activates and superimposes the display of embedded graphics files or overlays to create animated effects, provide additional information related to parts of the document, etc.

Another related feature is enabling image editing. This component allows the user to make changes, add text annotations or graphical markings and overlays, rotate, crop, scale or otherwise enhance the image. It works in conjunction with the watermarking module to update the host image and then embed or re-embed related files.

The overlay data and other related graphics and change markings are stored in overlay structures 520 embedded in the host data set.

Tracking

A tracking module 522 creates tracking data 524 representing information tracking the origin, distribution history and change history of the host data, and optionally, the history of changes to embedded data added by users of the host data. This tracking data may be separate from or combined with other embedded data in one or more embedded data files.

The tracking data 524 includes information identifying:
processes applied to the host image;
name or device identifier of user or device that has seen the image;
history of distribution, including who has received/processed the image, and what has been done to the image.

The tracking module also provides a graphical user interface for displaying the tracking data for authorized users.

Linking

The linking module 526 provides a mechanism for activating links to related data.

This may be implemented using browser software to fetch files from the computer, network or Internet. The links may be pointers to files, hyperlinks, URLs, etc. compatible with known object and hyper-linking software. These links are stored in linking data 528 and form part of the embedded bit stream. The targets of these links may be files embedded in the image, or files stored elsewhere on the computer system or network.

The linking module also operates in conjunction with the display module to associate active links with highlighted regions and/or overlays in the image. For example, if the user clicks on a highlighted building portrayed in the image, the display module communicates the coordinates of the selected location to the linking module, which in turn fetches the linked information, such as a text, image or audio file providing related information for a particular semantic object within the host image. This feature enables users of the image to add links and annotations to objects of interest depicted in the host image.

Distribution and Control

A distribution and control module 530 manages rules associated with distribution and control of the host image. These rules are stored in distribution and control data 532 and embedded in the host image.

The rules define directions for distribution for the host data file. For example, they may include automated instructions for e-mail distribution of the host data file. The distribution and control module reads these instructions and schedules the delivery and any appropriate follow up tasks of the host file. This may be implemented by interfacing the distribution module with available e-mail and scheduling software, such as Microsoft Outlook® and Microsoft Exchange®, for example.

The rules may also include a check list of individuals who must review the host data, which gets updated as each person on the list completes his or her review.

The rules may also include an auto-destruct rule that destroys the file after a predetermined event has been detected. This event may be, in part, based on a predetermined time or date as measured relative to a system clock. It may be triggered when review is complete. It also may be location or device dependent, where the image is destroyed if an attempt is made to open the file on an unauthorized system, in an unauthorized location, by an unauthorized person or application program.

The control information may also include rendering control information. For images, this rendering control information includes information to control printing and/or display. The printing control may include a variety of instructions and parameters for controlling printing on different types of printers. Examples of the information include Page Description Language (PDL) instructions. For instance, formatting and control information typically stored in a PDF file separate from image data in the file may be embedded in the image data using the reversible watermarking application program.

The control information may also include instructions for embedding a robust watermark, such as described in Ser. No. 09/503,881 or other robust watermark, in the rendered output. Such a robust watermark may be used to identify the source device or user that rendered the host data (e.g., for forensic tracing of the output to a particular device or user), to identify the rendered output through an object identifier persistently embedded in the rendered output, to persistently link the rendered output to metadata, including an electronic version of the host data, etc.

The control information may also include instructions that govern when copies of the host file can be made, as well as circumstances under which the host file can be transferred to another device.

Similar control information can be reversibly embedded in other media types like audio, video, and text. In the case of text, the reversible watermark can carry instructions for embedding a robust text or image watermark in the rendered text document.

Security

A security module 534 controls access to the host image as well as the auxiliary data embedded in it. This module operates in conjunction with other modules, such as the display and watermarking modules, to control access to the host image and embedded data. It provides an interface for determining the user's permission status, and enabling certain functions of the program, such as display, embedding and reading, based on that status.

The program can also be used to provide different levels of quality of the image with access to each level controlled based on the user's permission status. The security module manages this access by determining the permission status, and enabling display of selected parts of the image or selected levels of quality associated with the permission status. Levels of quality can be controlled by providing different levels of spatial resolution, or levels with varying amounts of perceptual distortion (e.g., distortion introduced by the reversible watermark, or some other noise source). Opaque overlays, embedded in the image, may be used to block or redact sensitive portions of a host image or document depending on permission level.

As described above, an image (or other host data set) can be recursively embedded with layers of reversible watermarks. In this case, each additional reversible watermark layer is embedded in a host data set that has been previously embedded with a reversible watermark by operating on values that have been modified by previous layers. As such, the process of extracting each layer and restoring the host data set operates in reverse order of the order in which the layers were embedded.

There are a number of ramifications of this approach. An image that serves as a logical storage unit (e.g., image as disk) for files in a first watermark layer can be used as a new disk for storing additional files in a second or subsequent reversible watermark layer. In order to extract files in the first layer, the files in the second layer are extracted and the image is restored to the state that it was in immediately after embedding the first layer. Each layer can store different auxiliary data, enabling a variety of different features or applications. The embedding of several layers in this manner can act as a method for progressively controlling the quality of the host data, where each layer progressively degrades quality such that with the extraction and restoration of the data set for each layer, the quality is improved.

The layers provide a method of access control for the auxiliary data. Each layer can be embedded with a different key used to extract and/or de-scramble a layer. Thus, in addition to extracting the layers in the correct order, one also needs the layer key to extract each layer. This enables the program to control access to the auxiliary data for each layer, as well as control access to higher quality versions of the host data, in the case where the layers are used to progressively control quality of the host data. To control access, the program may include an access control table that receives user identification, such as a user password or even biometric information (such as a facial image, fingerprint, voice print, iris or retinal scan, etc.) and generates the appropriate key or keys enabling that user to decode one or more reversible watermark layers.

The program may also be used to detect whether the host data has been altered. In the case of reversible watermarking by difference expansion, alteration can be detected based on the inability to perfectly restore the image, or based on comparing an embedded hash of the original image with a hash of the re-constructed image. This alteration detection may be localized to regions if the host image is partitioned into separate regions. In some applications, compressed versions of image blocks in the host image may be embedded in other blocks, enabling tampered portions to be restored by replacing them with the compressed version.

The security module may also be used to manage keys used to encrypt or scramble parts of the embedded bit stream, or scramble the location of the embedded data. These keys as well as other security data, such as access permissions, may be stored in security data 536 embedded in the host data set.

Visual Search

A visual search module 538 is used to facilitate searching for contents of host files based on descriptive material of the host content. This module provides descriptive data, such as text or descriptive graphics (e.g., icons) that describe what is depicted in the host image. This descriptive data is stored in visual search data 540 embedded in the host image. It can be used to facilitate automated searching, or manual "visual" searching.

In content database applications, it is advantageous to provide efficient mechanisms for searching a large collection of host data files. This can be achieved by using the descriptive data to form a searchable index of descriptive text or images that describe contents of corresponding host data files. One particular way to form the index is by creating a hierarchical structure of the descriptive data of the images in the collection based on content descriptors. These content descriptors may include names or graphical icons representing objects in the images, descriptors of regions of interest, geographic location, etc.

When the database finds images whose descriptive data matches with items in a search query, the thumbnails of the images can be displayed, along with the graphical descriptors of the file contents extracted from the embedded bit stream, enabling a user to view the search results graphically and quickly pick images that he or she is looking for.

Robust Watermark Parameters

The program may also be used to store parameters 542 of any robust watermarks embedded in the host data. One application of robust watermarks for images is to include auxiliary embedded data in a robust watermark that survives digital to analog conversion, such as printing of the image. Methods for embedding robust watermarks in images that survive print are described in Ser. No. 09/503,881 and U.S. Pat. No. 6,122,403, incorporated above. These robust watermarks survive one or more generations of printing and re-scanning, and are automatically read from digital images scanned from printed images. This type of robust digital watermark is useful for forensic tracking to trace a printed image to a source device or user that printed the image.

It also useful for persistent identification and linking back to an electronic version of the image in a database. For example, if a printed document is passed to another user, who wishes to see the original version, its history, etc., the user scans the document, extracts the robust watermark providing a pointer to the digital version, and fetches the digital version. This digital version has all of the features provided by the reversible watermark embedding.

It is also useful for device control, such as an embedded control instruction that blocks reproduction on devices enabled with watermark detectors. The message carried in a robust watermark may include identifiers, such as content identifier, source identifiers, device identifiers, etc., metadata or pointers to metadata stored in a database, and instructions.

The robust watermark parameters include information used to remove the robust watermark in the event that the host image has not been altered. For example, these parameters may include a key or a pointer to a key stored elsewhere that is used to generate a set of difference values that may be added to the host image to perfectly remove changes due to the robust watermark. Alternatively, the parameters may include a compressed version of the actual difference values needed to perfectly restore the original image. For more information on methods to make a robust, reversible watermark, see U.S. application Ser. No. 10/319,380 incorporated above.

Uses for the "Image as Disk" Program

There are a number of uses for the program, including digital asset management, security, content database searching, medical record management, promotional materials and documentation, document management, and photography.

Organizations with collections of documents, images and other embeddable files can use the program for tracking files. The program can also be used to enhance productivity of groups that work on documents, images, etc. by providing overlay capability for graphical annotations, links to related information and analyst annotations, and the capability to embed related data into the host data itself.

For sensitive files, the program enables multilevel security, controlling access to varying levels of quality of the host data set, as well as varying amounts of information embedded into or associated with the host data set via the reversible watermark.

As noted in the visual search section above, the program facilitates efficient, content-based searching through a database representing a collection of images, documents, etc.

In medical applications, the program provides an effective tool for storing and managing patient records by enabling the related records to be encapsulated within a medical image file or set of images. The host medical image (e.g., X-ray, patient photo, CAT scan, etc.) serves as a storage unit for related diagnosis with x-rays, patient photos, etc. In addition, the program provides access control to sensitive records stored within embedded image files. Also, the medical service provider can add annotations to the medical record that travel with the medical imagery that those annotations pertain to. These annotations can include links to information about related diseases, treatments, test data, etc. Embedded overlays may be used to highlight regions of interest in a medical image, such as a tumor, broken bone, or blocked artery. Color coded overlays may be used to highlight different body parts or regions of interest.

Businesses can use the program to provide asset management for documents and images. The above example implementation is adapted to images, and therefore, can be applied to documents rendered as images, such as PDF files or other Page Description Language files that include images. Alternatively, reversible watermarking may be applied to text representations, such as ASCII text, for example, where the numbers representing ASCII text characters are modified to carry auxiliary data.

As noted above, documents such as brochures, manuals, and electronic business cards can be created and made interactive using the program. For example, a host image representing a document can be reversibly embedded with links, additional information, pictures, graphical overlays, animation, etc. When the user selects the file of the host document, the program opens the file and displays the document, along with selectable options for getting the embedded data or activated embedded links. Searching through collections of such documents can be facilitated using the search tools described above.

This feature also enables a single file to represent many different versions of a single document. At the time of rendering for display or printing, the user can select which version he or she wants to view or print. Versions of an image or document with or without changes applied, or with or without overlays can be selected and printed.

The program also has a number of uses in photography. A photograph may serve as a host data set in which other related data is reversibly embedded and conveniently stored along with the host data. For example, the user can reversibly embed a variety of compressed files into the host photograph, including, for example, a compressed picture of photographer, as well as contact information for the photographer and metadata relating to the photograph. The photographer can distribute a degraded quality image with a key to access a higher quality version of that image to authorized users. In addition, the photographer can include audio tracks within the image by embedding compressed audio clips in the image.

These uses can also be extended to other media types, including audio and video files. Frames of video can include related information, such as accompanying audio track and audio-video track synchronization information. Different language audio tracks can be distributed with movies using reversible embedding to carry multiple compressed audiotracks. Audio files, similarly, can include song lyrics, links to related information (fan websites) and e-commerce sites to buy related products and services. The reversible watermark can be used to provide progressive levels of quality, which are accessible by removing layers of the reversible watermark.

Various versions of a movie, music track or image can be distributed as a single file with embedded data that controls which version to render. For example, a movie with content unsuitable for children can include embedded control flags, and even alternative scenes that are swapped into the movie depending on the age or tastes of the consumer.

Software Features and Integration with other Software

While the above discussion describes an application program, the program and related functions may be implemented as part of another program. One such example is compression utility program, such as PKZip® from PKWare, Inc. The compression and security features of such a program can be combined with reversible watermarking services to create a program that implements some of the functions described above. In such an application, the host data file, such as TIF or GIF image retains its image format, yet serves as a container for other files embedded in it using the reversible watermarking module. The user interface of the program, in this example, includes a window that represents the host data as a container for other files, which can be added or removed from the container by dragging and dropping the files' icons into the window. Double clicking the file icon of a host file automatically enables all of the features provided by the embedded data including:

- a window, drop down menu, or other graphical user interface (GUI) displaying list of overlays, which, when selected are superimposed on the host image.
- a GUI for multilevel security access control to different levels of detail or parts of the host image and related embedded data; this GUI enables entry of user log-on data (e.g., user name and password), and manages secure log-on table to control access to contents of host image, progressive levels of quality, and embedded data;
- a GUI displaying tracking information, and corresponding software for capturing tracking information each time host data is moved, opened, edited, etc.
- a GUI, e.g., pop up windows for embedded links; and
- software initiation of related programs, e.g., through software object automation, scripts, or Java that is triggered in response to opening the host image or selecting certain features enabled by the embedded data. Examples of automatic program activation include activating a file browser to get linked information, an image editor for editing host or embedded images, word processor for text annotation, media player for playing embedded audio clips, e-mail program for distribution of host file according to embedded distribution rules, etc.

Since the capacity of a host data file will vary, the program can also be designed to expand the host file size to create additional capacity, and format the extra space in the host file to carry compressed auxiliary data. This additional capacity can be provided in a manner that does not change the basic format of the host image file. For example, in an image file, the compressed data stored in the extra space may appear as a colorful region at the bottom of the image when displayed by a standard image viewer.

As described above, there are a variety of uses of a software program and related system for placing a structure of files within host media in a host file. Information, software code (e.g., application programs, scripts, web pages), encryption keys, etc. can be covertly stored within host media files on the computer system to protect sensitive data or thwart hacking. Often, encryption keys can be discovered by a hacker within an application program file or other file by searching the binary data for key-like characteristics. This type of key discovery is more difficult or impossible if the key were stored inside a digital watermark in an image or other host media signal. Likewise, a hacker or virus may attach malicious code to an executable file or library. This too would be prevented if the executable were hidden inside an image or other host media signal.

The technology for reversibly embedding files in other files can also be very useful when the data is to be passed to remote users, either via network downloads or removable media shipments. In the case where an image is to be sent along with descriptive analysis, it is often the analysis and annotation that is more sensitive than the image itself. Hiding the sensitive files within a host image or other media signal can prevent both interception and interpretation of the sensitive data, as well as preventing separation of the descriptive analysis from the image. Combining this with the described methods for controlled image degradation can allow sensitive images and annotations to be passed to authorized users over an unsecured channel without danger of the sensitive value being discovered by an interceptor. In other cases, the data may not be sensitive, but using this method can ensure that the data is not separated during transmission, while also providing the ease of a single file download or transfer.

In the case of image overlays stored in the reversible watermark, the overlays could, in fact, be small images that replace certain portions of the host image. This technique could be used to highlight areas where a change has occurred; for example, in the case of satellite imagery, displaying before and after images for damage assessment, natural disaster, traffic flow, crop management, urban sprawl, etc.

In medical images, the technology can be used to assist in compliance with HIPAA (and other future related acts). By hiding sensitive user data in the image, the data can be properly protected so that only appropriate data can be accessed by viewers of the data depending on their need and authorization as defined in HIPAA. Data with different levels of sensitivity can be embedded in the medical image in separate layers of the reversible watermark or randomly accessible reversible watermarks, each having their own decoding keys to restrict access to particular users, devices or systems. In this case, the program performs key management in the security module to control and facilitate restricted access to various parts of the embedded data.

Above, we discussed that the reversible watermark may be used to create animation rendered along with the host data. Embedded images or movies could be automatically initiated either by an event, such as opening the image, detecting the mouse cursor has passed over the image or a particular location in the image, or some other event. For example, when the user clicks on the image's file icon (selects "file open command" or otherwise selects the file), the reversible watermark application program is associated with the file such that the program is automatically launched by the operating system, and the program automatically extracts the reversible watermark, including any animation or graphic files, and displays the animation in conjunction with the display of the host data. As another example, the program displays the image in the host file, and when the user passes the cursor over an item of interest in the displayed image, or selects a feature, the program launches the animation extracted from the reversible watermark (or linked to the host file via a link embedded in the reversible watermark) that is uniquely associated with that location, feature or item in the image. The animation or link to animation stored elsewhere may be extracted previously from the reversible watermark, or automatically extracted upon an event, such as the cursor passing over or selecting an item of interest depicted in the image.

Object Code Applications

In U.S. application Ser. No. 10/319,404, we discussed how reversible watermarking may be used to reversibly embed auxiliary data in software code. Here, we elaborate on that application further.

The reversible watermark embedder can embed auxiliary information in an object code file using reversible watermarking to alter code data values in the file. One approach is to use the reversible watermarking scheme described above using difference expansion of correlated pairs of bytes, where the bytes of data being altered are not image pixel data, but bytes of code. In this particular case, the correlation may be less than in images, leading to lesser embedding capacity. However, for many applications, the data carrying capacity need not be as great.

One example application for reversible watermarking of object code is forensic tracking. In particular, the embedded bit stream includes user or machine information for forensic tracking purposes. The auxiliary bit stream can be embedded in segments of code when the program was installed. In addition, some code could be embedded with a global identifier or key while other parts could be embedded with auxiliary data customized by the user.

This forensic tracking application applies to multimedia content distribution, where files distributed or copied by a user are tagged with that user's ID. This can be used to combat piracy in electronic file delivery and sharing systems, including peer to peer file sharing systems.

The embedder can use the user's public key to encrypt the watermark so that only that user's private key would allow decoding of the embedded information, restoration of the original code, and then execution of the unmodified code. While one might alternatively encrypt the code to prevent access to the original executable code, encryption does not have the benefit of being able to include auxiliary data in the software code itself.

The object code to be reversibly watermarked could be treated specially and loaded by an application program or operating system equipped with a detector of watermarked code fragments. In this case, the program or operating system retrieves the watermark key in order to decode the watermark and restore the original unmodified code before executing it. As part of the decoding process, the program or operating system verifies that the payload of the watermark matches other user or machine information before enabling execution of the code.

The reversible embedder can also hide additional object code or software documentation within the reversible watermark of the target object code.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A non-transitory computer-readable medium having instructions stored thereon for transforming a host data file carrying host media data into a logical storage unit for storing auxiliary data files in a reversible watermark embedded into the host media data, that, if executed by a computing device, cause the computing device to perform operations comprising:

modifying original values of host media data elements in the host data file to embed a reversible watermark carrying auxiliary data files, the reversible watermark enabling the host media data elements to be restored to the original values;

representing the host data file as a container for the auxiliary data files; and enabling the adding or removing of auxiliary data files from the reversible watermark.

2. The computer-readable medium of claim 1, wherein the reversible watermark includes a file structure identifying the auxiliary data files stored in the reversible watermark.

3. The computer-readable medium of claim 1, wherein the operations further comprise determining auxiliary data carrying capacity of the host media data.

4. The computer-readable medium of claim 3, wherein the operations further comprise maximizing embedding capacity for a desired perceptual distortion.

5. The computer-readable medium of claim 3, wherein the operations further comprise maximizing auxiliary data carrying capacity of the host media data elements after compression.

6. The computer-readable medium of claim 1, wherein the host media data comprises a host image, and wherein the operations further comprise transforming the host image into a logical storage device for storing the auxiliary data files in the image.

7. The computer-readable medium of claim 6, wherein at least one of the auxiliary data files comprises an image overlay file, and wherein the operations further comprise extracting an image overlay file from the reversible watermark, and displaying an image overlay stored in the image overlay file superimposed on the host image.

8. The computer-readable medium of claim 7, wherein the overlay file is associated with one or more links and wherein the operations further comprise enabling the user to activate the one or more links to get additional information related to the overlay.

9. The computer-readable medium of claim 1, wherein at least one of the auxiliary data files includes one or more links to additional information related to the host media data, and wherein the operations further comprise enabling the user to activate the one or more links to get additional information related to the host media data.

10. The computer-readable medium of claim 1, wherein the operations further comprise for obtaining and storing tracking data in the reversible watermark indicating identifiers of individuals or devices that have received or opened the host media data file.

11. The computer-readable medium of claim 1, wherein the operations further comprise managing and storing distribution control information in the reversible watermark, the distribution control information controlling distribution of the host media data file.

12. The computer-readable medium of claim 1, wherein the host media data comprises an audio file, and wherein the operations further comprise transforming audio data in the file into a logical storage device for storing the auxiliary data files in the audio data.

13. The computer-readable medium of claim 1, wherein the reversible watermark is embedded in two or more layers, each of the layers being embedded iteratively in the host media data, wherein the host media data file embedded with a first layer is input to a subsequent reversible embedding process to embed a second layer.

14. The computer-readable medium of claim 13, wherein the operations further comprise controlling access to the two or more layers.

15. The computer-readable medium of claim 13, wherein the layers are extracted in reverse order, and as each layer is extracted, the changes made to the host media data to embed the layer are reversed such that successive extraction and restoration of all of the layers enables perfect reconstruction of the original host media data file.

16. The computer-readable medium of claim 13, wherein the layers add distortion to the host media data and enable progressive perceptual quality control of the host media data by enabling reversal of changes made to embed each layer through successive reversal of the layers in reverse order of embedding.

17. The computer-readable medium of claim 13, wherein a separate key is used to embed each layer and enables selective control over access to each embedded layer of the reversible watermark.

18. The computer-readable medium of claim 1, wherein the operations further comprise partitioning the host media data into partitions that store randomly accessible reversible watermarks embedded in the partitions.

19. The computer-readable medium of claim 1, wherein the reversible watermark includes rendering control information for controlling rendering of the host media data.

20. The computer-readable medium of claim 19, wherein the host media data includes an image and the rendering control information includes information for controlling printing of the image.

21. The computer-readable medium of claim 1, wherein the reversible watermark includes visual search information used to facilitate visual searching of the host media data file.

22. The computer-readable medium of claim 1, wherein the host media data comprises a medical image, and the reversible watermark includes information identifying a region of interest in the medical image.

23. The computer-readable medium of claim 1, wherein the host media data comprises a medical image, and the reversible watermark includes a medical record corresponding to the medical image.

24. A method of reversibly embedding forensic tracking information in a host data comprising;
 obtaining, by a computing device, forensic tracking information used to track the host data to a particular device or user;
 modifying original values in the data file to embed a reversible watermark that carries auxiliary forensic tracking information in the host data file; wherein the reversible watermark enables the original values to be perfectly restored by extracting the reversible watermark and inverting modifications made to embed the reversible watermark; wherein the host data includes object code and the reversible watermark is embedded into at least one segment of the object code when the object code is installed.

25. The method of claim 24, wherein the host data comprises object code.

26. The method of claim 24, wherein the reversible watermark is embedded using a key associated with a particular device or user.

27. The method of claim 26, wherein the key comprises is one of a public-private key pair.

28. The method of claim 24, wherein the reversible watermark is used to control execution of the object code.

* * * * *

UNITED STATES PATENT AND TRADEMARK OFFICE
CERTIFICATE OF CORRECTION

PATENT NO.         : 8,059,815 B2                                     Page 1 of 1
APPLICATION NO.    : 10/435612
DATED              : November 15, 2011
INVENTOR(S)        : Lofgren et al.

It is certified that error appears in the above-identified patent and that said Letters Patent is hereby corrected as shown below:

Title Page, item (56), under "Other Publications", in Column 2, Line 12, delete "Goljan et a1," and insert -- Goljan et al, --.

Title Page, item (56), under "Other Publications", in Column 2, Line 33, delete "Construction" and insert -- Constructions --.

Column 26, line 51, in Claim 10, delete "comprise for obtaining" and insert -- comprise obtaining --.

Column 28, line 10, in Claim 24, delete "comprising;" and insert -- comprising: --.

Column 28, line 29, in Claim 27, delete "comprises is" and insert -- comprises --.

Signed and Sealed this
Twenty-ninth Day of May, 2012

David J. Kappos
*Director of the United States Patent and Trademark Office*